US007736106B2

(12) United States Patent
Talbot et al.

(10) Patent No.: US 7,736,106 B2
(45) Date of Patent: Jun. 15, 2010

(54) LOCKING SYSTEM FOR ROLL-OFF CONTAINERS

(75) Inventors: Robert A. Talbot, Holland, MA (US); Edward N. Haddad, Jr., Worcester, MA (US); Greg L. Mosdell, Cedar City, UT (US)

(73) Assignee: Wastequip Manufacturing Company LLC, Beachwood, OH (US)

( * ) Notice: Subject to any disclaimer, the term of this patent is extended or adjusted under 35 U.S.C. 154(b) by 587 days.

(21) Appl. No.: 11/634,346

(22) Filed: Dec. 5, 2006

(65) Prior Publication Data

US 2008/0129057 A1 Jun. 5, 2008

(51) Int. Cl.
*B60P 7/08* (2006.01)
*B60P 7/13* (2006.01)

(52) U.S. Cl. .......................................... 410/80; 410/94

(58) Field of Classification Search .................. 410/77, 410/80, 84, 85, 90, 101, 69; 292/95, 194, 292/99, 198, 341.17
See application file for complete search history.

(56) References Cited

U.S. PATENT DOCUMENTS

| | | | | |
|---|---|---|---|---|
| 1,649,598 | A * | 11/1927 | Kirchner | 410/79 |
| 2,351,314 | A * | 6/1944 | Ario | 410/67 |
| 2,424,429 | A * | 7/1947 | Bamberg | 414/544 |
| 2,427,603 | A * | 9/1947 | Higgins | 410/80 |
| 2,944,492 | A * | 7/1960 | Clejan | 410/65 |
| 5,494,386 | A * | 2/1996 | Paull | 410/77 |
| 5,618,138 | A * | 4/1997 | Lockhart | 410/69 |
| 6,053,692 | A | 4/2000 | Mason et al. | |
| 6,315,508 | B1 * | 11/2001 | Nadon | 410/80 |
| 6,695,553 | B1 | 2/2004 | Galbreath et al. | |
| 6,736,585 | B2 * | 5/2004 | O'Daniel | 414/498 |
| 2008/0170925 | A1 * | 7/2008 | Marmur | 410/80 |
| 2009/0095866 | A1 * | 4/2009 | Brescia | 248/313 |

OTHER PUBLICATIONS

Automatic Lock website www.automaticlock.com/default-en.htm.

* cited by examiner

*Primary Examiner*—Patricia L Engle
(74) *Attorney, Agent, or Firm*—Weingarten, Schurgin, Gagnebin & Lebovici LLP

(57) ABSTRACT

A locking system for locking a container to a vehicle includes a locking assembly mounted to a hoist frame and a striker assembly mounted to the vehicle chassis. The locking assembly has at least one hook for hooking over a frame member of the container. The hook has a center of mass that biases the hook to an unlocked position. The striker assembly strikes the hook at a location to move the hook against the bias of the hook's center of mass into a locked position in which the hook is hooked over the frame member of the container. As the hoist frame supporting the container is lowered, the striker assembly contacts the hook and rotates the hook against the bias of the hook's center of mass into the locked position. As the hoist frame is raised, the hook rises as well and loses contact with the striker assembly, thereby falling away from the hoist frame and unlocking the container.

14 Claims, 10 Drawing Sheets

LOCKING SYSTEM FOR ROLL-OFF CONTAINERS

STATEMENT REGARDING FEDERALLY SPONSORED RESEARCH OR

N/A

CROSS REFERENCE TO RELATED APPLICATIONS DEVELOPMENT

N/A

BACKGROUND OF THE INVENTION

Some trucks have containers that roll off and on the truck bed. Typical roll-off trucks have a pair of rails that extend along the truck bed and pivot upwardly creating a ramp on which a container rolls on or off, aided by a cable hoist system or a hydraulic hook for loading or unloading the container.

Roll-off containers must have a secondary locking system that is engaged during transport. Typically, containers are secured with straps, chains, or a powered automatic locking system. These systems require an operator to perform some activity before loading or unloading a container. It is possible for an operator to forget to attach the straps or chains or to activate the power lock before driving off. Also, if the operator were to forget to remove the straps or chains or to deactivate the power lock before rolling the container off, damage to the container, hoist or truck could occur.

SUMMARY OF THE INVENTION

A locking system for locking a container to a vehicle is provided that requires no action by the operator. The locking system locks the container down as the hoist frame rails are lowered and unlocks the container as the hoist frame rails are lifted.

The locking system includes a locking assembly mounted to a rail of the hoist frame. The locking system has at least one hook for hooking over a frame member of the container. The hook has a center of mass located to bias the hook to an unlocked position. A striker assembly includes a striker element disposed to strike the hook at a location to move the hook against the bias of the hook's center of mass to a locked position in which the hook is hooked over the frame member of the container. As the hoist frame rail supporting the container is lowered, the striker element contacts the hook and rotates the hook against the bias of the hook's center of mass into the locked position. As the hoist frame rail is raised, the hook rises as well and loses contact with the striker element, thereby falling away from the hoist frame rail and unlocking the container.

The striker assembly includes a biasing element to bias the striker element into contact with the hook while allowing movement of the striker element away from the locked position of the hook should the hook encounter an obstruction that prevents movement of the hook into the locked position. Preferably, two hooks are provided, so that at least one hook is able to lock the container down even if the other hook is obstructed.

A keeper element engages the striker element in the locked position to prevent the striker element from falling out of contact with the hook, for example, when the vehicle is driven over rough terrain.

DESCRIPTION OF THE DRAWINGS

The invention will be more fully understood by reference to the following detailed description when considered in conjunction with the accompanying drawings, in which.

DETAILED DESCRIPTION OF THE INVENTION

Figure 1:
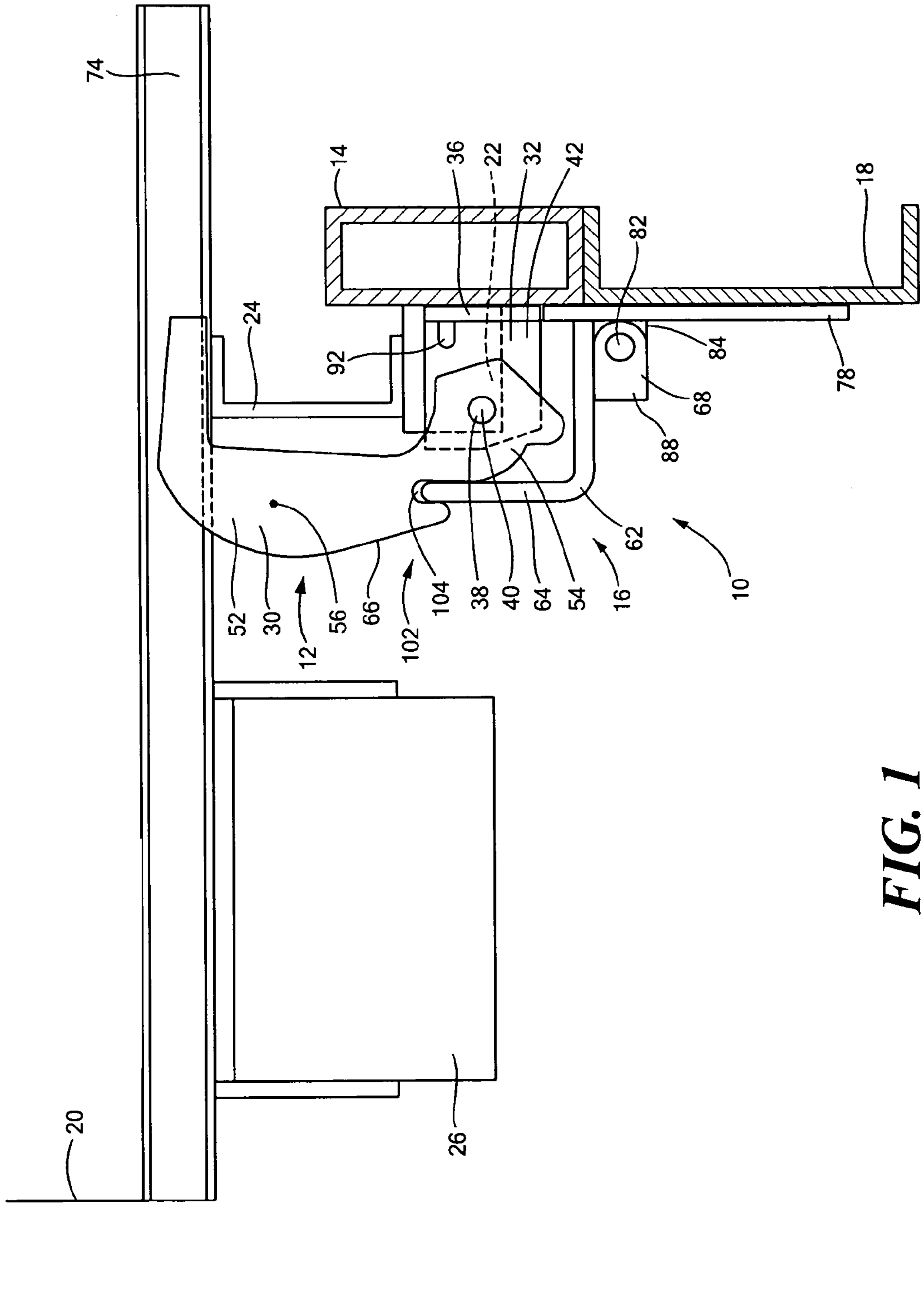
FIG. 1 is a side view of an embodiment of a locking system for roll-off containers.
Figure 2B:
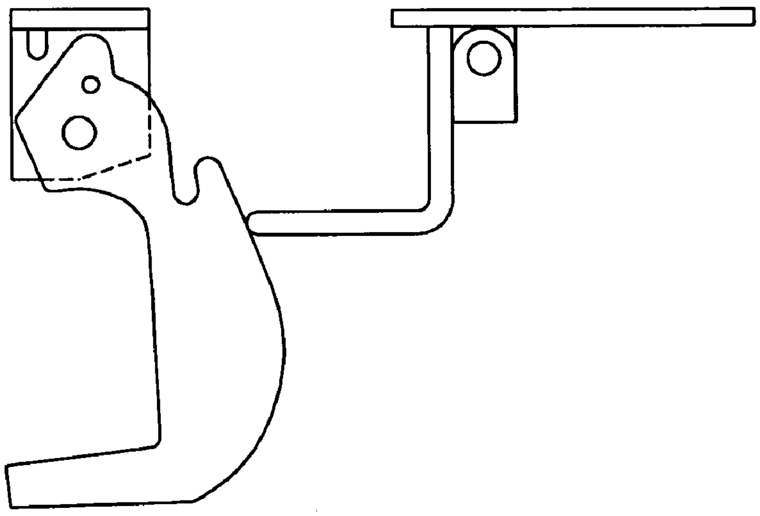
FIGS. 2A-2G illustrate an operation sequence of the locking system of FIG. 1.
Figure 2A:
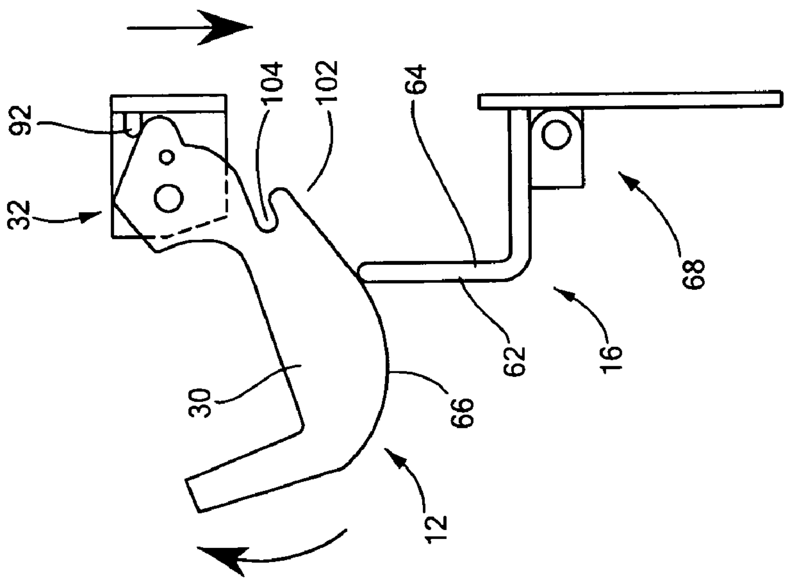
Figure 2C:
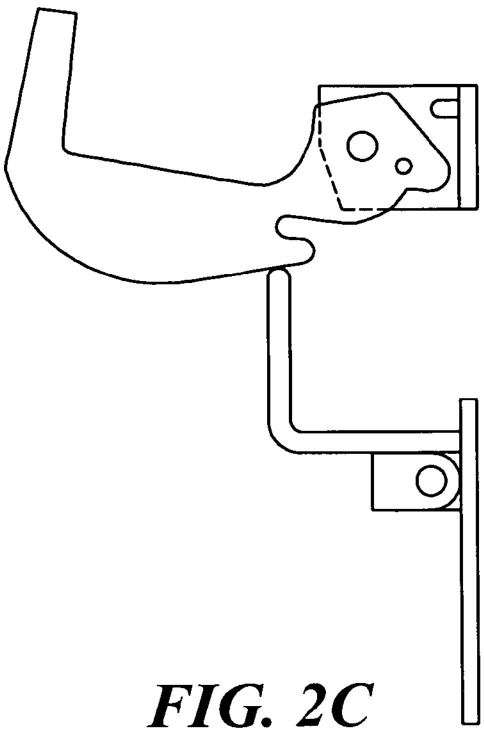
Figure 2D:
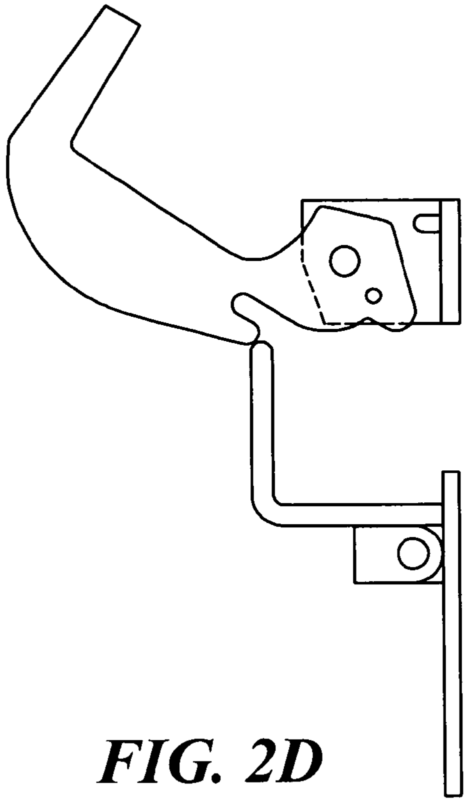
Figure 2E:
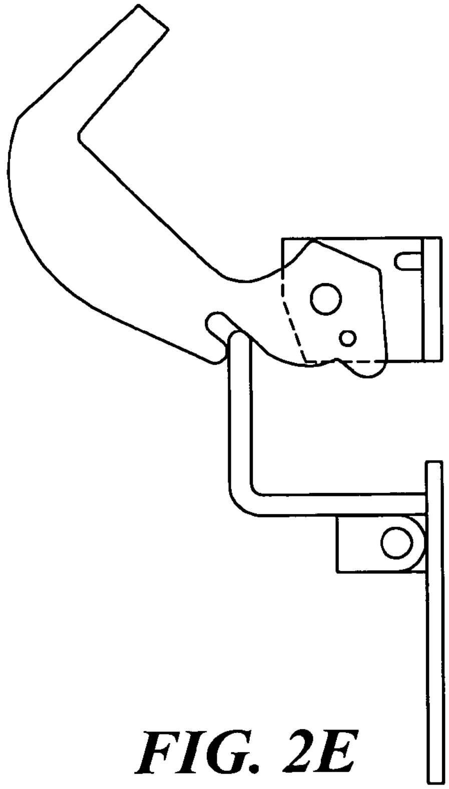
Figure 2F:
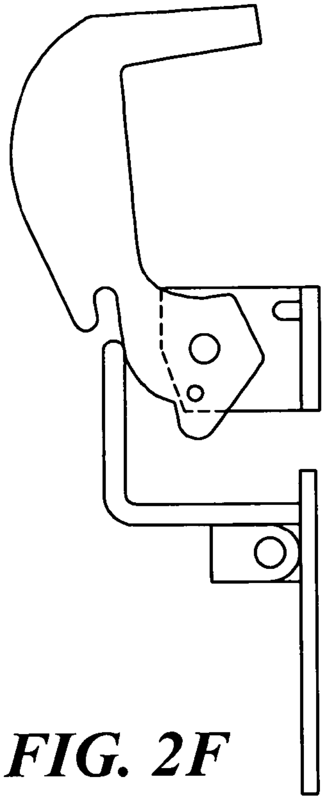

An embodiment of a locking system for a roll-off container is illustrated in FIGS. 1 and 2A-2G. The locking system 10 includes a locking assembly 12 mounted to a hoist frame rail 14 and a striker assembly 16 mounted to a vehicle chassis 18 to retain the locking assembly in a locked position on a container 20. The striker assembly 16 remains stationary with the vehicle chassis, while the locking assembly 12 is raised or lowered with the hoist frame rail 14 as the container is loaded or unloaded. Hoist rollers 22 are mounted to the hoist frame rail 14. A container frame member 24 is supported on the hoist rollers. When the hoist frame rails are tilted up (only one rail is shown), the container rolls on or off along the hoist rollers under the control of a cable hoist system or the like. Container rollers 26 allow the container to roll on the ground.

The locking assembly 12 includes at least one and preferably two hooks 30 that are pivotably mounted to the rail 14. In a locked position, the hooks hook over a portion of the container, such as a frame member 24. Each hook has a center of mass located to bias the hook to an unlocked position rotated away from the container frame member 24. The striker assembly 16 includes a striker element 62 associated with each hook that strikes the hook along an outer edge of the hook. As the hoist frame rail 14 supporting the container is lowered, the striker element contacts the hook and rotates the hook against the bias of the hook's center of mass into the locked position. See the sequence shown in FIGS. 2A-2G.

In use, a first locking system 10 is provided on one side of the vehicle and a second locking system is provided on the opposite side of the vehicle, so that the container is locked to the vehicle on both sides only one locking system is illustrated in the figures herein, the other locking system preferably being substantially the same.

Figure 3:
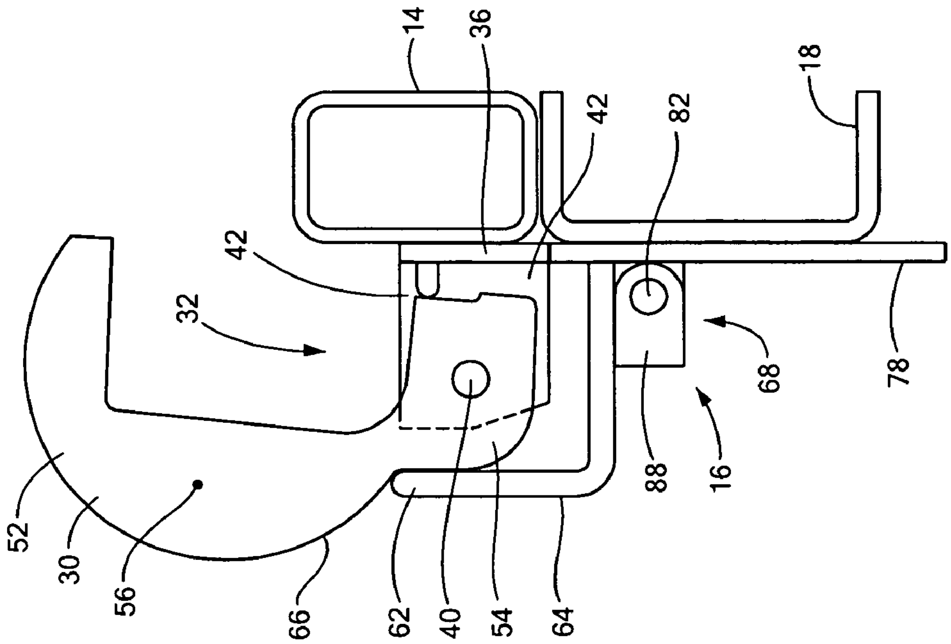
FIG. 3 is a side view of an embodiment of a locking system in a locked position.
Figure 2G:
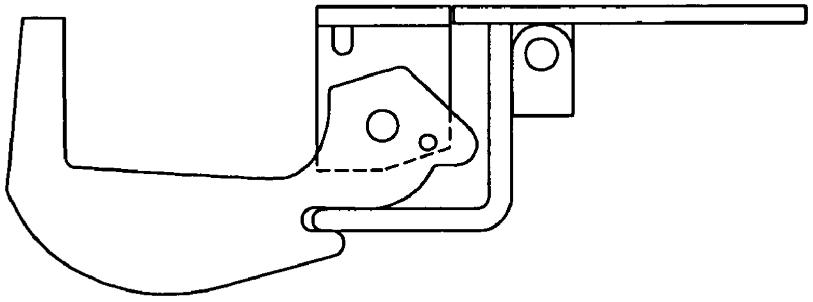
Figure 5:
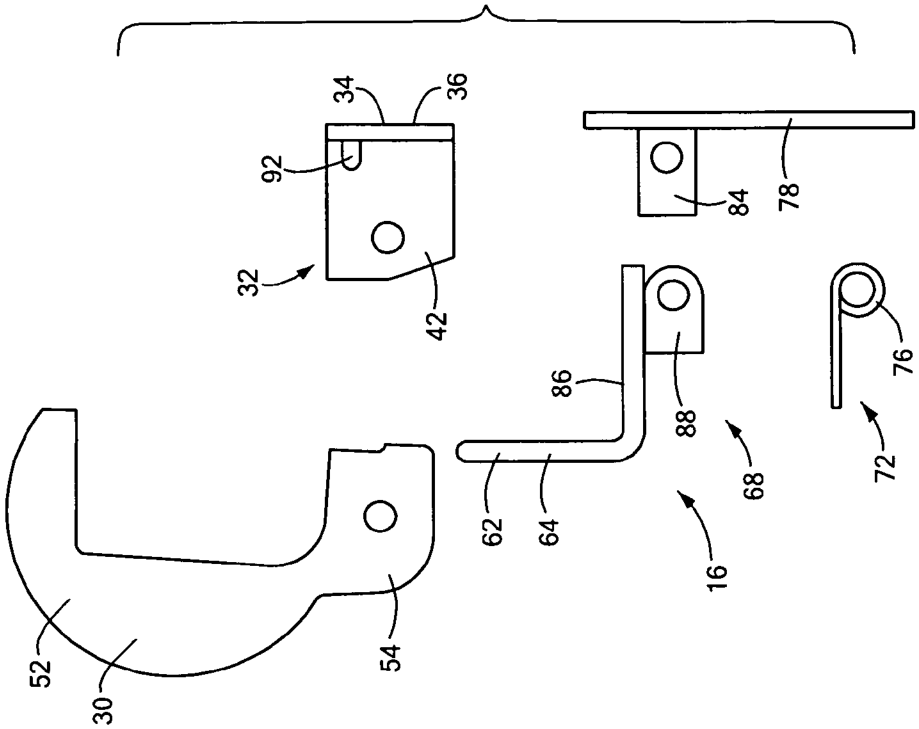
FIG. 5 is an exploded view of the locking system of FIG. 3.
Figure 4:
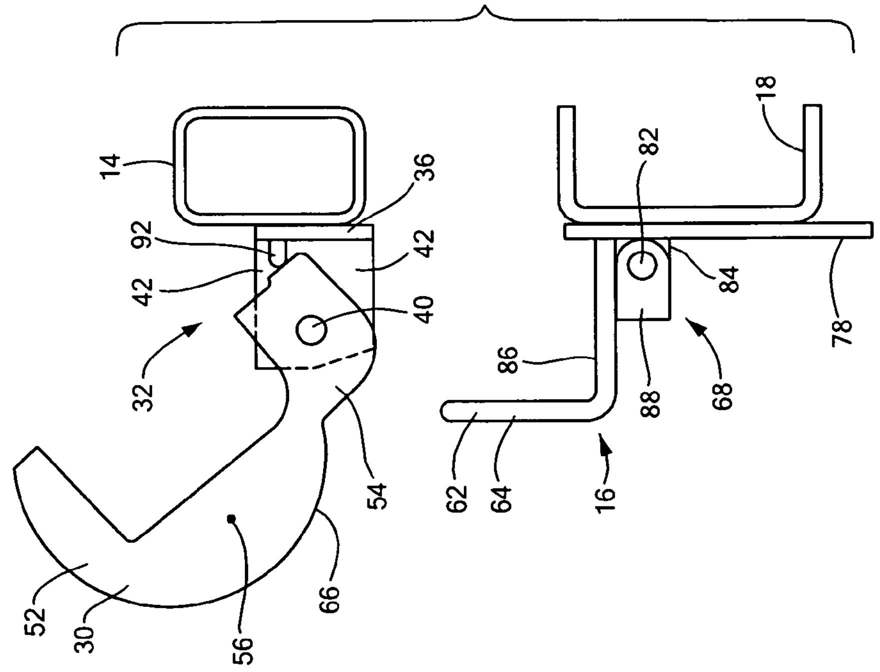
FIG. 4 is a side view of the locking system of FIG. 3 in an unlocked position.
Figure 7:
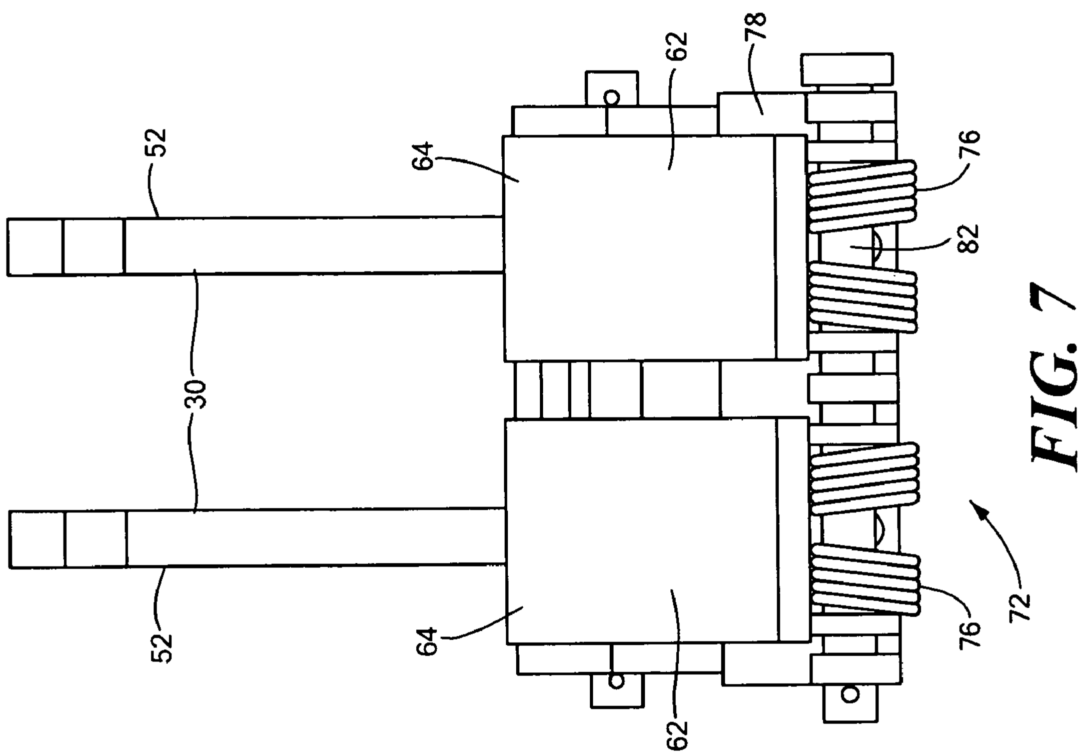
FIG. 7 is a front view of the locking system of FIG. 3.
Figure 6:
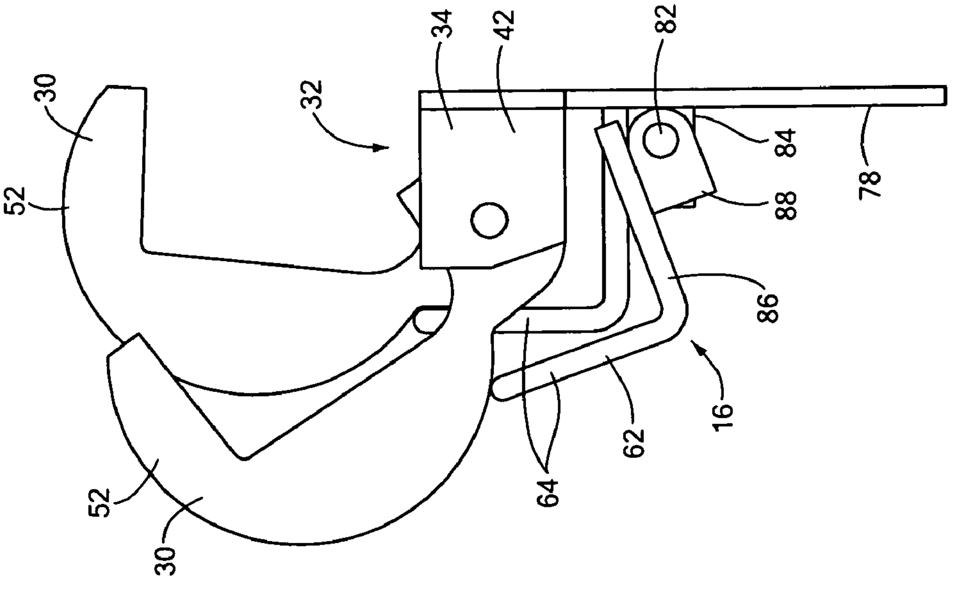
FIG. 6 is a side view of the locking system of FIG. 3 illustrating one hook in a locked position and a further hook obstructed from attaining a locked position.
Figure 8:
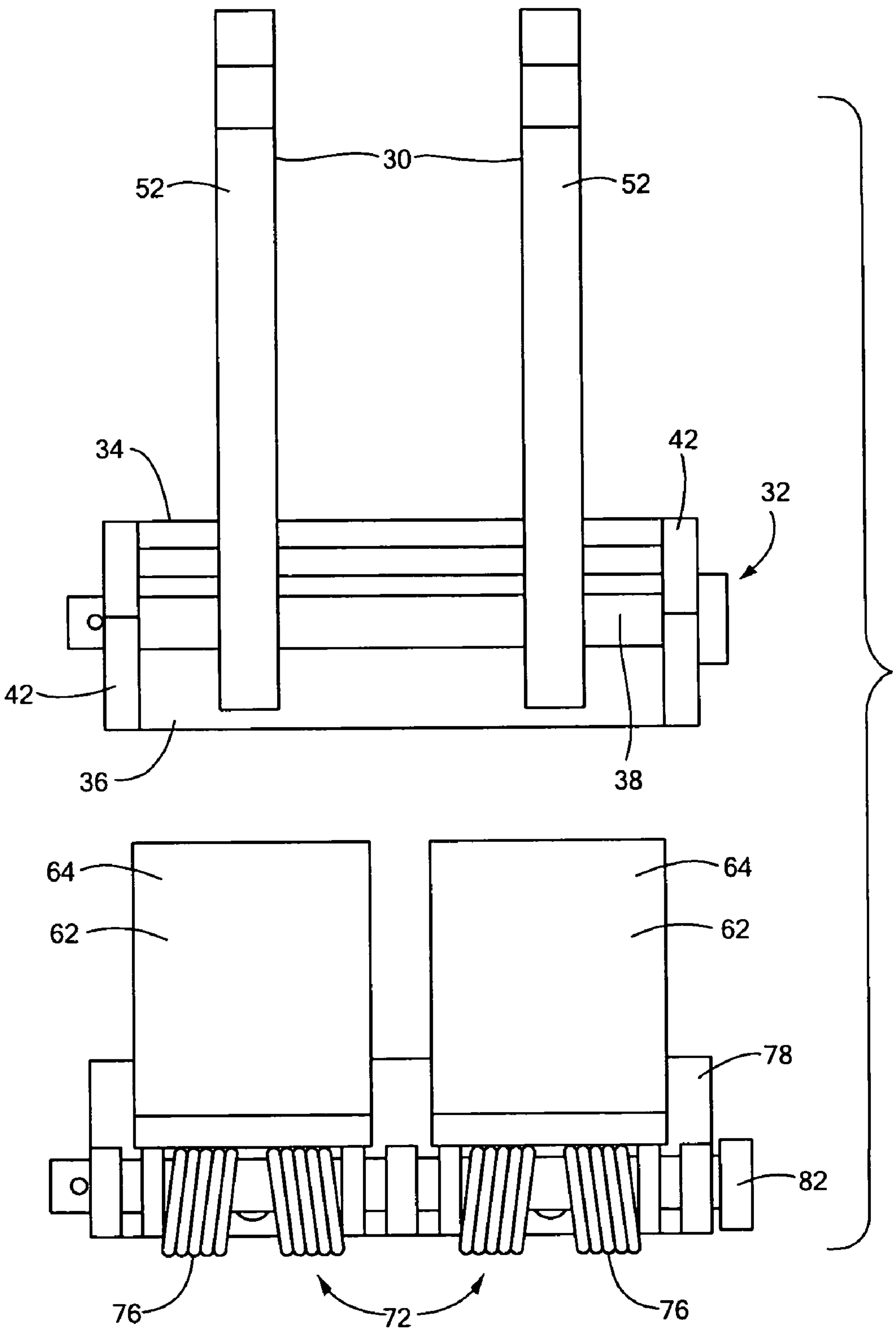
FIG. 8 is a partially exploded view of the locking system of FIG. 3.
Figure 9:
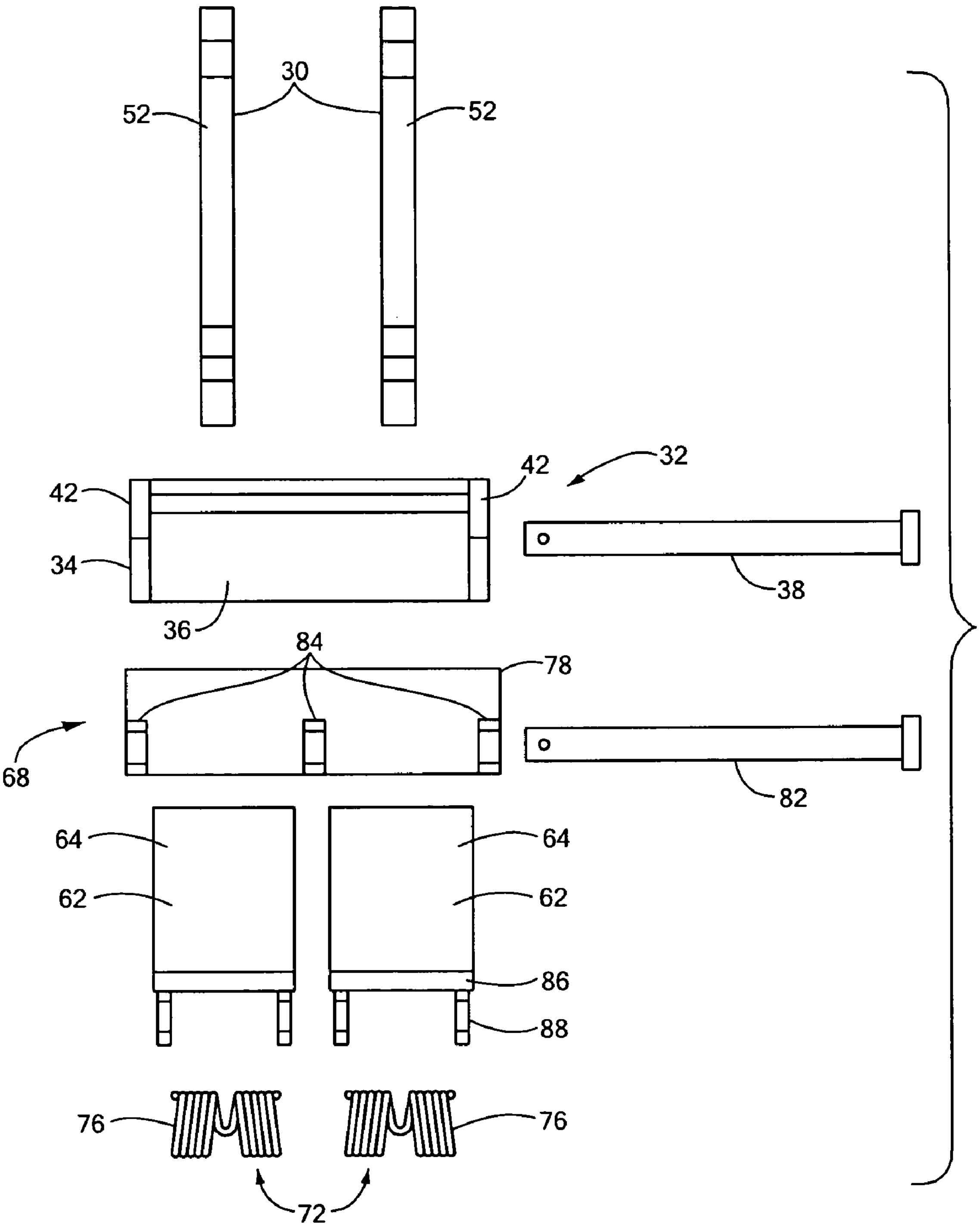
FIG. 9 is an exploded view of the locking system of FIG. 3.

More particularly in the embodiment illustrated, the locking assembly includes two hooks 30 (FIGS. 6-9) that are pivotably mounted via a mounting mechanism 32 (FIGS. 3-5, 8, 9) to the rail 14. The mounting assembly includes a hook housing 34 having a back plate 36 mounted to the rail in any suitable manner, such as by bolts or welding. A hook pivot pin 38 is attached to the hook housing in any suitable manner. For example, flanges 42 extend from the back plate 36 at suitable locations, such as the sides, and the hook pivot pin 38 extends through openings in the side flanges to define a pivot point 40 (FIGS. 3, 6). Each hook 30 includes a hook arm 52 that fits over the frame member 24 of the container 20. Each hook also includes a mounting base 54 that has an opening therein through which the hook pivot pin 38 extends. The hook pivots on the pivot pin between an upright, locked position in which the hook arm fits over the top of the container frame member (FIGS. 1, 3) and an unlocked position in which the hook arm is rotated away from the frame member of the container (FIG. 4).

The center of mass 56 of each hook 30 is located in the hook arm 52 at a point laterally offset from the pivot point 40 in the mounting base 54 when the hook is in the upright position in which it locks down the container frame member 24. Thus, the hook 30 is biased to rotate outwardly to an open position away from the container frame member. The hook 30 is retained in the upright, or locked, position, against the bias of its offset center of mass, by the striker assembly 16.

The striker assembly 16 includes two striker elements 62, one striker element associated with each hook of the hook assembly. In the embodiment illustrated, the striker element is a plate 64 biased to extend upwardly to contact the hook 30. As the hoist frame rails 14 are lowered, the plate 64 comes into contact with its associated hook 30 along an outer edge 66 of the hook and forces the hook to rotate upwardly, against the bias of the hook's center of mass, to the locked position. See FIGS. 2A-2G.

The striker element 62 is mounted via a mounting mechanism 68 to the vehicle chassis 18 and biased via a striker biasing element 72 into contact with the hook 30. Should the hook encounter an obstruction, such as a container rib member 74 (FIG. 1), that prevents movement of the hook into the locked position, the striker biasing element 72 allows movement of the striker element 62 and concomitantly the hook 30 out of the locked position. See FIG. 6.

In the embodiment shown, the biasing element includes a torsion spring 76. See FIGS. 5 and 7-9. The striker mounting mechanism 68 includes a mounting plate 78 mounted to the chassis in any suitable manner, such as with bolts or welding. A striker element pivot pin 82 is attached to the mounting plate in any suitable manner. For example, flanges 84 extend from the mounting plate at suitable locations, such as the sides and middle. An angled leg 86 is attached to or integral with the striker plate 64. Brackets 88 depend from the leg 86. The striker element pivot pin 82 extends through openings in the brackets 88 and flanges 84. The torsion spring 76 is disposed over the pivot pin with its end abutting the bottom surface of the leg 86, thereby biasing the spring plate upwardly.

Figure 11:
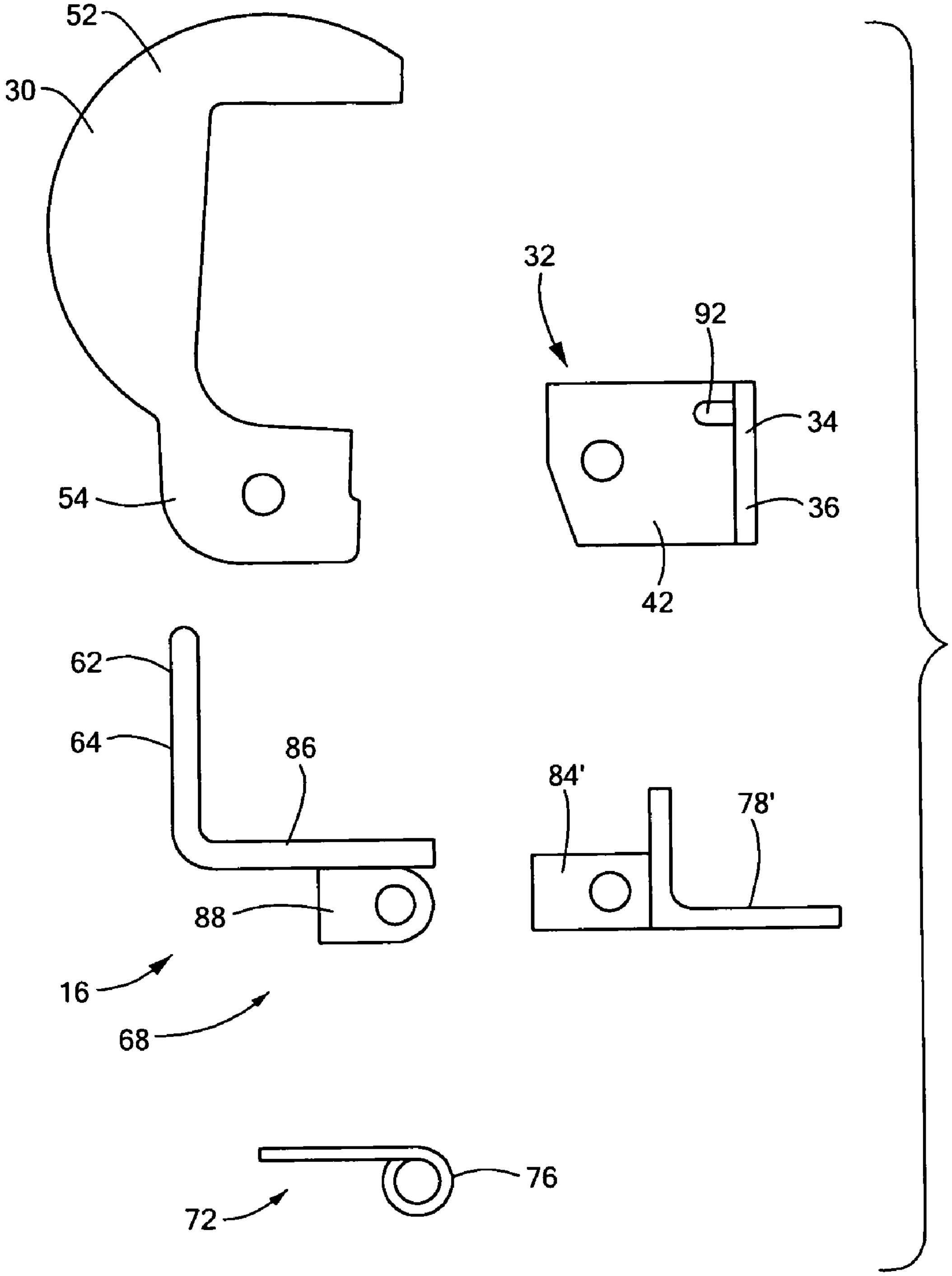
FIG. 11 is an exploded view of a further embodiment of a locking system.

In another embodiment (see FIG. 11), the mounting mechanism 68 includes an angle 78' that is mounted to the chassis with one leg between the chassis 18 and the hoist frame rail 14 and the other leg against the chassis. The angle 78' can be mounted in any suitable manner, such as with bolts or welding. Flanges 84' extend from the angle 78', as described above with respect to the flanges 84.

The spring plates 64 are each independently spring loaded to bias the plate into an upward position. Because the spring plates and hooks operate independently of each other, if one hook is blocked, the other hook is still able to rotate to the closed position and latch onto the container. For this reason, two hooks are preferred, although one hook could be provided if desired.

To unload a container, the hoist frame rails are raised. As the rails rise up, the hooks move out of contact with the striker assembly. The hooks then fall away from the container automatically, because of the location of the center of mass offset laterally from the pivot point. A stop 92 may be located on the mounting mechanism 32 to engage the mounting base 54 and prevent the hook from rotating over too far. See FIG. 2A. The operator may operate the hoist and load and unload the container in the usual manner, and the hooks engage or disengage depending on their position in relation to the striker assembly.

The locking system preferably includes a keeper element 102 to retain the striker element in contact with its associated hook while the vehicle is being driven. In one embodiment shown in FIGS. 1 and 2A-2G, the keeper element is a downwardly opening slot 104 formed in the outer edge 66 of the hook 30. The striker element fits within the slot when in the locked position, which retains the striker element in contact with the hook. Without the keeper element, the striker element could potentially fall out of contact with the hook, for example, when the vehicle bounces over rough terrain while it is being driven. In this event, the hook's center of mass would allow the hook to unlock from the container rail. FIGS. 2A-2G illustrate a sequence of a hook moving into the locked position by contact with the striker element, with the striker element retained in the locked position by the slot in the hook.

Figure 10:
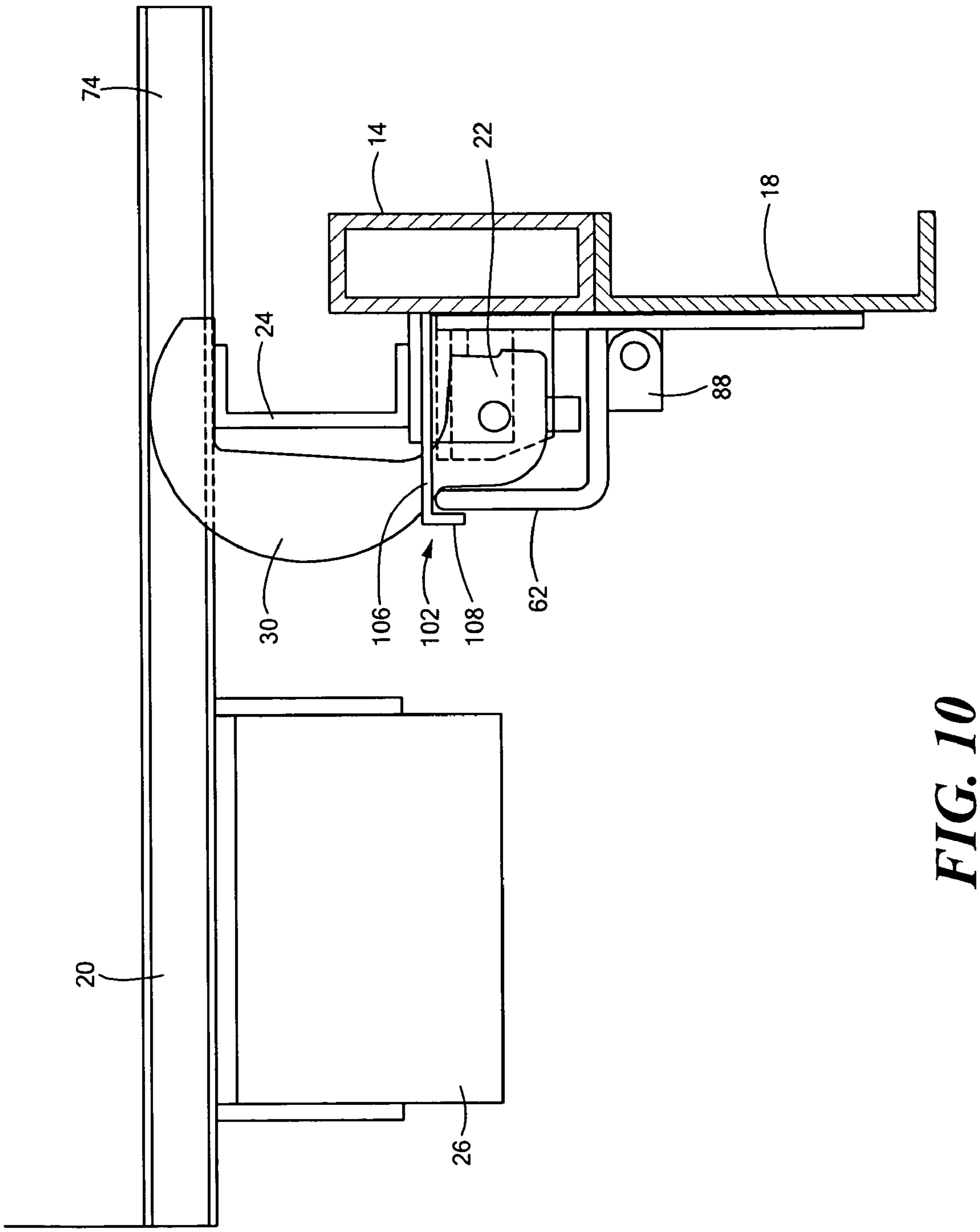
FIG. 10 is a side view of a further embodiment of a locking system for roll-off containers.

In another embodiment shown in FIG. 10, the keeper element 102 is a plate 106 with a downward lip 108 at its end extending from the hoist frame rail 14. The top edge of the striker element 62 is engaged by the lip, which thereby retains the striker element in contact with the hook.

The invention is not to be limited by what has been particularly shown and described, except as indicated by the appended claims.

What is claimed is:

1. A locking system for locking a container to a vehicle, the vehicle including a chassis and a hoist frame liftable and lowerable to load and unload the container, the locking system comprising:

- a locking assembly comprising:
  - at least one hook for hooking over a portion of the container, the hook having a center of mass located to bias the hook to an unlocked position, and
  - a mounting mechanism for pivotably mounting the locking assembly to the hoist frame;
- a striker assembly comprising:
  - a striker element disposed to strike the hook at a location to move the hook against the bias of the hook's center of mass to a locked position in which the hook is hooked over the portion of the container,
  - a striker biasing element disposed for biasing the striker element into contact with the hook and for allowing movement of the striker element away from the locked position of the hook when the hook encounters an obstruction preventing movement of the hook into the locked position, and
  - a mounting mechanism for mounting the striker assembly to the vehicle chassis; and
- a keeper element disposed to engage the striker element in the locked position, the keeper element comprising a plate with a downward lip extending from the hoist frame, the top edge of the striker element engaged by the lip when in the locked position.

2. The locking system of claim 1, wherein:

the locking assembly further comprises a second hook adjacent the at least one hook for hooking over the portion of the container, the second hook having a center of mass located to bias the second hook to an unlocked position; and the striker assembly further comprises a second striker element disposed to strike the second hook at a location to move the second hook against the bias of the second hook's center of mass to a locked position in which the second hook is hooked over the portion of the container, and a second striker biasing element disposed for biasing the second striker element into contact with the second hook and for allowing movement of the second striker element away from the locked position of the second hook when the second hook encounters an obstruction preventing movement of the second hook into the locked position.

3. The locking system of claim 1, wherein the striker element comprises an upstanding plate pivotably mounted to the vehicle chassis.

4. The locking system of claim 3, wherein the striker assembly mounting mechanism includes a leg extending between the plate and the chassis, the leg pivotably mounted to the chassis.

5. The locking system of claim 4, wherein the striker biasing element includes a torsion spring in contact with the leg.

6. The locking system of claim 1, wherein the locking assembly mounting mechanism includes a pivot pin mounted to the hoist frame, the hook pivotably mounted on the pivot pin.

7. The locking system of claim 1, further comprising a stop mounted on the hoist frame for limiting rotation of the hook in an unlocked position.

8. A locking system for locking a container to a vehicle, the vehicle including a chassis and a hoist frame liftable and lowerable to load and unload the container from the chassis, the locking system comprising:

a hook mounted to the hoist frame for hooking to a portion of the container, the hook having a center of mass located to bias the hook out of hooking contact with the container;

a striker element mounted to the vehicle chassis for biasing the hook into hooking contact with the container against the bias of the center of mass; and a plate with a downward lip extending from the hoist frame to keep the striker element in biasing contact with the hook when in hooking contact with the container, wherein the striker element has a top edge engaged by the lip when the striker element is in biasing contact with the hook and the hook is in a locked position.

9. The locking system of claim 8, wherein the hook is pivotably mounted to the hoist frame.

10. The locking system of claim 8, wherein the striker element is pivotably mounted to the chassis.

11. The locking system of claim 8, wherein the striker element is spring mounted to the chassis.

12. The locking system of claim 8, further comprising a second hook mounted to the hoist frame for hooking to a portion of the container, independently biased by a second striker element into hooking contact with the container.

13. The locking system of claim 8, further comprising a stop for limiting rotation of the hook in an unlocked position when the hook is not in hooking contact with the container.

14. The locking system of claim 8, wherein the striker element comprising an upstanding plate pivotably mounted to the vehicle chassis.

* * * * *

UNITED STATES PATENT AND TRADEMARK OFFICE

CERTIFICATE OF CORRECTION

PATENT NO. : 7,736,106 B2
APPLICATION NO. : 11/634346
DATED : June 15, 2010
INVENTOR(S) : Robert A. Talbot et al.

It is certified that error appears in the above-identified patent and that said Letters Patent is hereby corrected as shown below:

Column 1, line 5, "OR" should read --OR DEVELOPMENT--;

Column 1, line 10, delete the word "DEVELOPMENT"; and

Column 2, line 63, "sides only" should read --sides. Only--.

Signed and Sealed this
Twentieth Day of March, 2012

David J. Kappos
*Director of the United States Patent and Trademark Office*